(No Model.) 2 Sheets—Sheet 1.
S. H. SHORT.
MODE OF ARRESTING ELECTRIC LOCOMOTIVES.
No. 474,031. Patented May 3, 1892.
FIG. I.
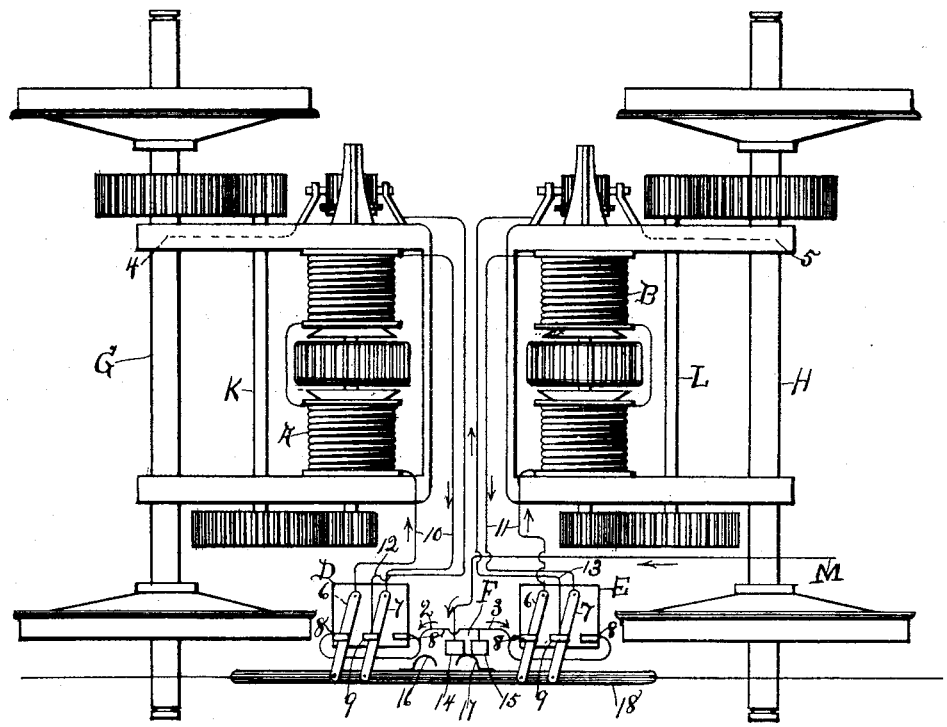
FIG. II.
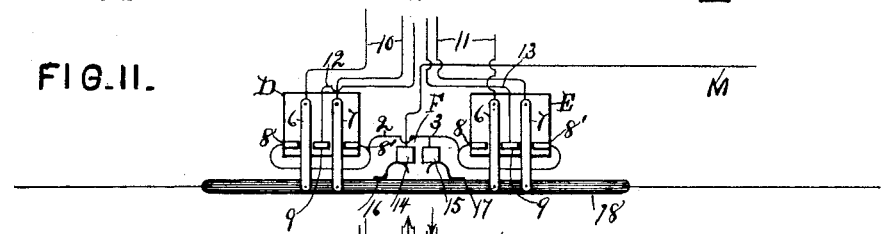
FIG. III.
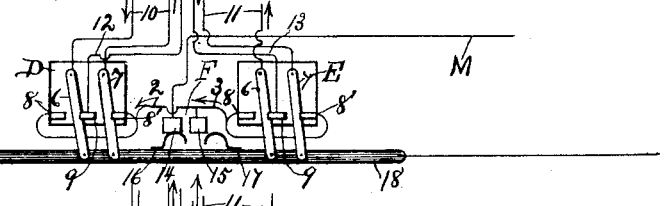
FIG. IV.
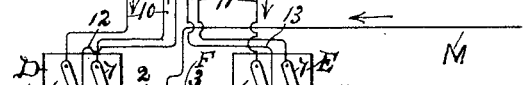
Witnesses
R. E. Auld.
G. F. Downing.
Inventor
Sidney H. Short
By H. A. Seymour
Atty (No Model.)
S. H. SHORT.
MODE OF ARRESTING ELECTRIC LOCOMOTIVES.
No. 474,031. Patented May 3, 1892.
2 Sheets—Sheet 2.
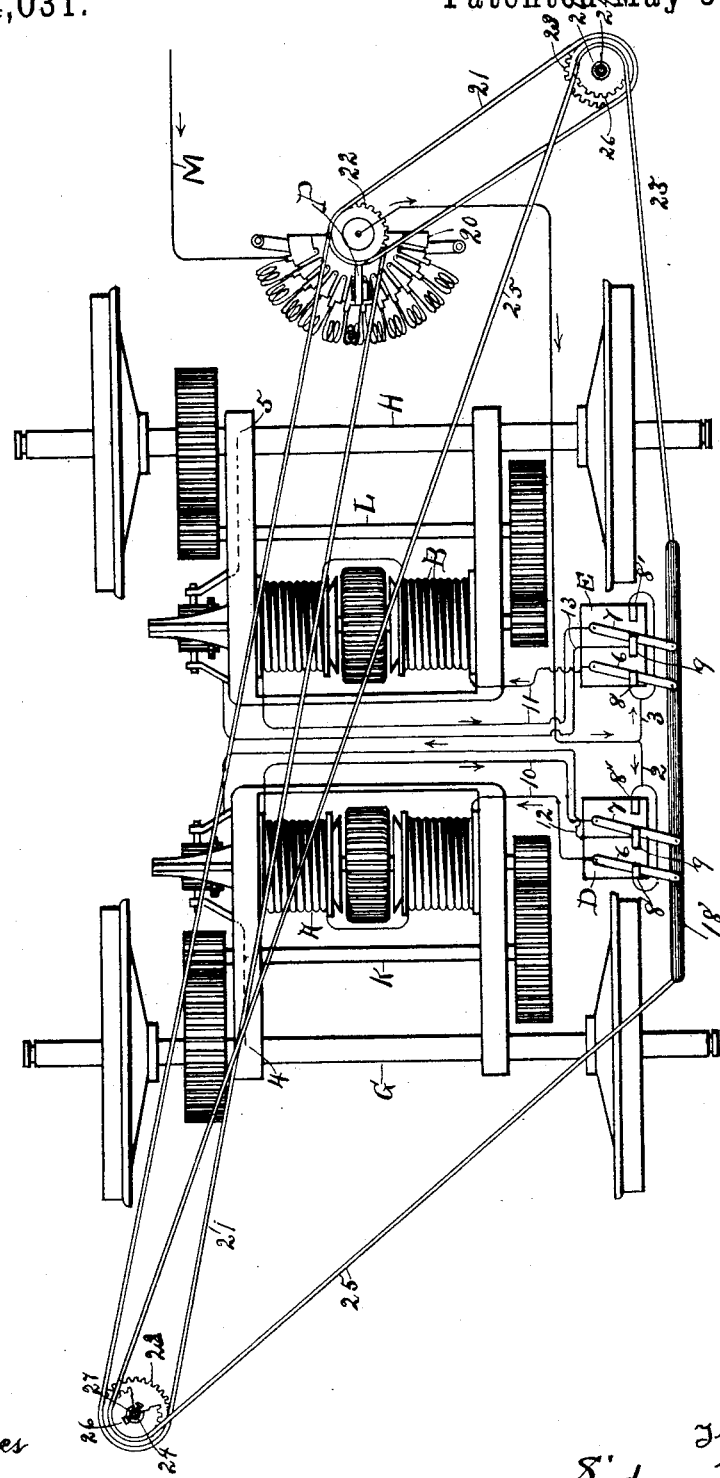

UNITED STATES PATENT OFFICE.

SIDNEY H. SHORT, OF CLEVELAND, OHIO.

MODE OF ARRESTING ELECTRIC LOCOMOTIVES.

SPECIFICATION forming part of Letters Patent No. 474,031, dated May 3, 1892.

Application filed March 10, 1891. Serial No. 384,448. (No model.)

*To all whom it may concern:*

Be it known that I, SIDNEY H. SHORT, of Cleveland, in the county of Cuyahoga and State of Ohio, have invented certain new and useful Improvements in Arresting Electric Motor-Cars and Switching Apparatus Therefor; and I do hereby declare the following to be a full, clear, and exact description of the invention, such as will enable others skilled in the art to which it appertains to make and use the same.

This invention relates to a method of and means for arresting, stopping, or checking the speed of electric cars by means of their propelling-motors without employing the electricity from the trolley line or other source of electricity used for propulsion.

Heretofore it has been proposed to reverse the current of electric cars for the purpose of stopping the same; but this is objectionable not only on account of the quantity of electricity which is thus used up, but also on account of the liability to burn out the motors. In accordance with the present invention the motors—say two in number—are disconnected from the ordinary supply-wire and are connected in a local circuit with each other in such a way that the current generated in the said local circuit and acting on a motor or the generation of current therein by a motor acting as a generator or both operations tend to check the forward movement of the car. Thus by connecting the two motors of a car in the local circuit so that the electro-motive force of each motor under the rotation imparted to the same by the forward movement of the car opposes that of the other motor and tends to produce a current in the direction to increase its own field magnetism and cut down that of the other motor, the car will be checked or brought to a sudden stop if it is running rapidly, and if it is on a heavy grade will creep slowly down the same without taking current from the supply-wire and without having the brakes set. In effecting this one motor overpowers the other (owing to the difference in the residual magnetism of their fields, even when the motors are made like each other, as customary,) and reverses the field polarity of the weaker motor, which is thereupon operated as a motor in the direction to run the car backward by the current supplied from the more powerful motor acting as a generator. When the supply-circuit is disconnected and the local circuit is established, as just described, the current in said local circuit may be very weak, because the difference is but slight in the residual field magnetism in the two motors, which are generating opposing electro-motive forces. This weak current increases the said difference by strengthening the field of the stronger and cutting down the field magnetism of the weaker motor until the field magnetism of the latter is reversed, whereupon, as said above, the current from the stronger motor (acting as a generator) tends to turn the armature of the weaker motor backward, or in the direction to reverse the movement of the car. By the present invention the car is under the control of the person or persons thereon, although accident may have disconnected it from the main current and the brakes may have given out on a steep grade.

The new method above described may be carried into effect by different modes or by different apparatus. Practically two motors on a car are connected in multiple in the ordinary supply-circuit, and provision is made for a reversing-switch in the branch of each motor and for a circuit-breaker in the supply-circuit. The new method may be carried out, however, when the supply-circuit is broken, whether by accident or otherwise.

A special feature of invention consists in a double reversing-switch or pair of connected reversing-switches provided with a circuit-breaker so arranged that the supply-circuit is operated by said circuit-breaker when the reversing-switches are operated, but can be closed by a further movement of the said switches or their operating mechanism or of some device connecting therewith, thus connecting the motors again in circuit with the propelling-current, but in the opposite direction. Instead of connecting the circuit-breaker with the reversing-switches or their operating mechanism, so as to be operated in appropriate sequence by the same appliances, the said circuit-breaker may be operated independently.

My invention extends to apparatus in general, which comprises the reversing-switches in the several motor branches, the circuit-breaker in the supply-circuit, and operating mechanism, whereby a person without altering his position may break the circuit and also reverse the switches, so as to check or stop the movement of the car by the operation of the motors in a local circuit. Such operating mechanism may comprise two shafts on the dash-board of the vehicle or other appliances accessible to the motor-man, with suitable connections therefrom to the circuit-breaker and reversing-switches, respectively.

In the accompanying drawings, which form part of this specification, Figure I is a diagram or simplified plan of the propelling machinery of an electric-motor car provided with switching apparatus in accordance with the invention. Figs. II, III, and IV are diagrams illustrating different positions of said reversing mechanism, and Fig. V is a diagram illustrating mechanism for operating the reversing-switches separately from the circuit-breaker.

A and B are the two propelling-motors of the car, D and E the two reversing-switches, and F the circuit-breaker for the supply-circuit. The armature of each motor is shown as geared to the corresponding axle G or H through spur-gears and a counter-shaft K or L; but may be otherwise connected therewith. The supply-circuit M, after passing through the circuit-breaker F, divides into the motor branches, each of which includes a wire 2 (or 3,) a reversing-switch D (or E,) and a motor A (or B,) and is shown as grounded at 4 (or 5) by way of the corresponding axle G (or H;) but of course other modes of grounding the circuit could be used or a metallic circuit could be made for the motors. The reversing-switches D and E, as shown, are alike and comprise each the two levers 6 and 7, mechanically connected with but electrically insulated from each other, the two outer contacts 8 and 8', which are electrically connected, and the middle contact 9. The loop 10 from the levers 6 and 7 of the switch D includes the field-magnet coils of the motor A, and the corresponding loop 11 from the switch E includes the field-magnet coils of the motor B, although, of course, it could include the armature in place of the field-coils. The wire 12 (or 13) connects the middle contact 9 of each switch with a commutator-brush of the corresponding motor A, (or B,) the other brush being grounded at 4, (or 5.) The outer contacts 8 and 8' of each switch are connected by the wire 2 (or 3) with the contact 14 (or 15) of the circuit-breaker. This latter device comprises the contacts 14 and 15, insulated from each other, and the springs 16 and 17, insulated from each other and mounted on a carrier common to both in the form of a bar 18 of non-conducting material, (as wood, for example,) which also mechanically connects the levers of the switches D and E with each other. The springs 16 and 17 are each adapted to close the break between the contacts 14 and 15, so as to complete the supply-circuit M when either of said springs is in the proper position. The springs are so placed on the carrier-bar 18 that by a further movement of said bar they establish the electrical connection between the contacts 14 and 15 after the switch-levers have been shifted to alter the connections of the reversing-loops 10 and 11.

The operation is as follows: In Fig. I the supply-circuit is completed at the circuit-breaker E by the spring 17, and the current, dividing, passes to ground, as shown by the arrows, one part by the wire 2, contact 8, and lever 6 of switch D, loop 10 and field-coils of motor A, lever 7 and contact 9 of switch D, and wire 12 and armature of motor A to the ground at 4, the other part of the electric current passing by the wire 3, contact 8, and lever 6 to switch E, loop 11, and field-coils of motor B, lever 7 and contact 9 of switch E, and wire 13 and armature of motor B to the ground at 5. The current rotates the armatures of both motors in the same direction, so that they co-operate to propel the car, (say to the right.) To check the car, the carrier-bar 18 is moved to the right. The first movement removes the spring 17 from the contact 14 and opens the supply-circuit, and a further movement breaks the motor branches at the reversing-switches D and E, as shown in Fig. II. A further movement to the right reverses the switches, as shown in Fig. III, without closing the supply-circuit at E. A current is now set up in the local circuit, which, commencing at the ground 5 and ending at the ground 4, includes the armature of motor B, the wire 13, the contact 9, and lever 6 of switch E, (see Fig. III,) the loop 11 and field-coils of motor B, the lever 7 and contact 8' of switch E, the wires 3 and 2, the contact 8', and lever 7 of switch D, the loop 10 and field-coils of motor A, the lever 6 and contact 9 of switch D, and the wire 12 and armature of the motor A. In this local circuit, when it is first formed, the two motors, being now revolved by the momentum of the car, generate opposing electro-motive forces. One of these opposing electro-motive forces being naturally the stronger, owing to the usual (if not inevitable) difference of residual magnetism in the two machines A and B, prevails over the other and establishes its current in the local circuit. Assuming that the machine B becomes the stronger generator, the current will then flow in the local circuit, as indicated by the arrows in Fig. III. In the wire 13, which is connected with the armature of the generator B, (as the motor B has now become,) the current will flow in the opposite direction to that indicated in Fig. I. In the loop 11 of the generator B it will flow in the same direction, as indicated in Fig. I, thus increasing the field magnetism, and consequently the electromotive force of generator B. In the loop 10 of motor A it will flow in the opposite direction to that indicated in Fig. I, and therefore decrease the field magnetism, and consequently also the counter electro-motive force of the motor A. As this counter electro-motive force decreases with the increase of the electro-motive force of the generator (or generating-motor) B, the current from the latter rapidly augments and reverses the polarity of the field of the motor A. Before this field magnetism is reversed the current from generator B tends to revolve the armature of the motor A in the same direction as in Fig. I, but feebly. So soon, however, as the polarity of the field of motor A is reversed the current from generator B tends to revolve the armature of motor A backward and to stop the car. Thus the car is checked by the resistance of the motor B acting as a generator, in conjunction with the reversal of the motor A under the influence of the current from the said generator. As the movement of the car ceases the current from the generator B ceases, also, and if the car is on a downgrade it will creep slowly down said grade at a speed at which the acceleration under the action of gravity is balanced by the augmentation of the power of the system (composed of the generator B and motor A) with the increase of speed.

If the machine A, acting as a generator, should be of greater electro-motive force than the machine B, the effect will be the same as above described, only the direction of the current will be the reverse of that indicated by the arrows in Fig. III, and the motor B will be operated by the current from the generator A.

In order to propel the car in the opposite direction, the supply-circuit is closed by moving the bar 18 over to the extreme right, which will cause the spring 17 to bridge the space between the contacts of the circuit-breaker E. In moving the bar 18 to the left the like effects are attained—that is to say, the supply-circuit is opened—and while it is opened the switches D and E are reversed, and then a further movement of the bar 18 closes the supply-circuit.

Referring to Fig. V, the parts similarly marked are the same as in Figs. I to IV. The circuit-breaker is formed by the switching-arm P of the car-rheostat. When said arm P has traveled over all the resistance-contacts, it breaks the supply-circuit M and rests upon an insulated or insulating rest 20. The arm P is shown as operated by a chain 21, between the wheel 22, fast on the hub of arm P, and the wheel 23, fast on the lower end of a vertical shaft 24, which may be extended alongside of the dash-board of the car and be operated by the motor-man on said platform. The bar 18, connecting the switches D and E, is operated through a chain 25 by means of a sprocket-wheel 26 on the lower end of a hollow shaft or sleeve 27, which surrounds the shaft 24, so that either of said shafts can be turned by the motor-man without shifting his position. With this form of apparatus the circuit is opened by turning the arm P, and the switches D and E are then reversed. The operation of the current in the local circuit is the same as described with reference to Figs. I to IV. The chain 25 would extend around a sprocket-wheel 26 at each end of the car, and a chain would extend from the wheel 22 to each end of the car, so that the switching apparatus can be operated indifferently from either end.

Having fully described my invention, what I claim as new, and desire to secure by Letters Patent, is—

1. The method of arresting or checking the movement of electric motor-cars provided with two propelling-motors by breaking the supply-circuit and connecting the motors in a local circuit in such a way that the electro-motive force of each motor, acting as a generator under the rotation imparted thereto by the forward movement of the car, opposes the other and tends to produce a current in the direction to increase the magnetism of its own field and to cut down or reverse the field magnetism of the other motor, substantially as described.

2. In combination with the motors of an electric car arranged in multiple, switching apparatus comprising the reversing-switches, one in each of the motor branches, a circuit-breaker in the supply-circuit, and operating mechanism connecting the said switches and circuit-breaker, substantially as described.

3. In combination with the motors of an electric car arranged in multiple, switching apparatus comprising the reversing-switches, one in each motor branch, the circuit-breaker in the supply-circuit, and operating mechanism for said switches and for said circuit-breaker, adapted to be operated by a person, without altering his position, so as to break the supply-circuit and reverse the switches, thereby putting the motors in a local circuit with the supply-circuit open, substantially as described.

4. The method of checking or arresting electric motor-cars propelled by two electric motors, which consists in cutting off the supply-current and operating one of the motors by the momentum of the car to generate current for reversing the other motor, substantially as described.

5. The method of checking or arresting electric motor-cars propelled by two electric motors having different current-generating capacities, consisting in cutting off the supply-current and placing the two motors in a local circuit in series and operating the motor of greater capacity by the momentum of the car to generate current for the reversal of the other motor, substantially as described.

In testimony whereof I have signed this specification in the presence of two subscribing witnesses.

SIDNEY H. SHORT.

Witnesses:
E. H. MORRISON,
A. B. CALHOUN.